United States Patent
Buck et al.

(10) Patent No.: US 7,222,615 B2
(45) Date of Patent: May 29, 2007

(54) METHOD AND DEVICE FOR OPERATING AN INTERNAL COMBUSTION ENGINE HAVING EXHAUST-GAS RECIRCULATION

(75) Inventors: Rainer Buck, Tamm (DE); Dirk Foerstner, Stuttgart (DE); Wilhelm Blumendeller, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/215,338

(22) Filed: Aug. 29, 2005

(65) Prior Publication Data

US 2006/0042608 A1 Mar. 2, 2006

(30) Foreign Application Priority Data

Aug. 28, 2004 (DE) .................. 10 2004 041 767

(51) Int. Cl.
*F02M 25/07* (2006.01)
*F02B 47/08* (2006.01)
*F02B 33/44* (2006.01)
*G06F 19/00* (2006.01)

(52) U.S. Cl. ................ 123/568.12; 60/605.2; 701/108

(58) Field of Classification Search ........... 123/568.11, 123/568.12, 568.16; 701/108; 60/278, 279, 60/320, 321
See application file for complete search history.

(56) References Cited

U.S. PATENT DOCUMENTS 6,085,732 A * 7/2000 Wang et al. ........... 123/568.12
6,725,847 B2 * 4/2004 Brunemann et al. ... 123/568.12
6,848,434 B2 * 2/2005 Li et al. ................. 123/568.12
2003/0213230 A1 * 11/2003 Yahata et al. ................ 60/278

FOREIGN PATENT DOCUMENTS

DE   199 63 358       7/2001
DE   100 03 060      10/2003
JP   2002129996 A  * 5/2002  ............ 123/568.12

* cited by examiner

Primary Examiner—Willis R. Wolfe, Jr.
(74) Attorney, Agent, or Firm—Kenyon & Kenyon LLP

(57) ABSTRACT

Provided are a method and device for operating an internal combustion engine having exhaust-gas recirculation, the method and device allowing a diagnosis of an exhaust-gas recirculation cooler during normal operation of the internal combustion engine. In this context, a variable characteristic of the functioning of the exhaust-gas recirculation cooler is monitored. The variable characteristic of the functioning of the cooling device is ascertained as a function of a measured value. The variable characteristic of the functioning of the exhaust-gas recirculation cooler is specified on the basis of an intact exhaust-gas recirculation cooler. The ascertained value of the variable characteristic of the functioning of the exhaust-gas recirculation cooler is compared to the predefined value. An error is detected when the ascertained value of the variable characteristic of the function of cooling device deviates from the specified value.

11 Claims, 2 Drawing Sheets

METHOD AND DEVICE FOR OPERATING AN INTERNAL COMBUSTION ENGINE HAVING EXHAUST-GAS RECIRCULATION

FIELD OF THE INVENTION

The present invention relates to a method and a device for operating an internal combustion engine having exhaust-gas recirculation.

BACKGROUND INFORMATION

Methods and devices for operating an internal combustion engine having exhaust-gas recirculation are well-known. In this context, it is also known that a cooling device can be provided in an exhaust-gas recirculation line for cooling the recirculated exhaust gas. Since the cooling device in the exhaust-gas recirculation line has an effect on the exhaust-gas emissions of the internal combustion engine, the legislature requires, in the case in which the internal combustion engine drives a vehicle, that the cooling function of the cooling device be monitored within the scope of an on-board diagnosis. Above all, the monitoring is necessary in order that the American OBDII limit values for exhaust-gas emissions can be satisfied.

German Patent No. 100 03 060 describes a monitoring function, which evaluates the dynamic response of temperature sensors in the time and frequency ranges on the basis of control actions of an exhaust-gas recirculation valve. In this context, it is problematic that extreme control actions of the exhaust-gas recirculation valve can lead to undesired torque changes and additional pollution from emissions. Since the inertia of the temperature sensors causes the action to last relatively long, during this time complex coordination is necessary between other operating modes, such as NOx-catalyst regeneration, etc., which also act on the exhaust-gas recirculation valve.

SUMMARY OF THE INVENTION

The method and device of the present invention for operating an internal combustion engine having exhaust-gas recirculation have the advantage over the related art that the variable characteristic of the functioning of the cooling device is ascertained as a function of a measured value, that the variable characteristic of the functioning of the cooling device is specified on the basis of an intact cooling device, that the ascertained value of the variable characteristic of the functioning of the cooling device is compared to the specified value, and that an error is detected when the ascertained value of the variable characteristic of the functioning of the cooling device deviates from the specified value. In this manner, the monitoring of the variable characteristic of the functioning of the cooling device may be implemented in a particularly simple and low-cost manner. In addition, extreme control actions of an exhaust-gas recirculation valve are not necessary, and the monitoring may also be implemented during normal operation of the internal combustion engine. Therefore, no special monitoring operating state is necessary for monitoring the variable characteristic of the functioning of the cooling device.

It is particularly advantageous if the error is only detected, when the ascertained value of the variable characteristic of the functioning of the cooling device deviates from the specified value by more than a first, predefined threshold value. In this manner, tolerances present while ascertaining the value of the variable characteristic of the functioning of the cooling device, as well as modeling inaccuracies in the selection of the value of the variable characteristic of the functioning of the cooling device, may be taken into account, so that they are not mistakenly recognized as errors in the functioning of the cooling device.

A further advantage is realized, when the monitoring is only carried out at selected operating points of the internal combustion engine. In this manner, it may be ensured that the result of the monitoring of the functionality of the cooling device is also reliable, when the predefined operating points are selected in a suitable manner. For this purpose, it is useful to select, as specified operating points, operating points of the internal combustion engine having a mass flow rate of recirculated exhaust gas greater than a predefined threshold value. In this case, the effect of the functioning of the cooling device in the exhaust-gas recirculation line is only first noticeable, when the specified threshold value is suitably selected.

It is similarly useful when engine operating points, at which the internal combustion engine is operated at steady-state, are selected as predefined operating points. This prevents the monitoring result from being falsified by a dynamic change in the operating variables of the internal combustion engine.

It is also advantageous, when different error reactions are initiated, depending on whether the ascertained value of the variable characteristic of the functioning of the cooling device deviates from the specified value by more than a second predefined threshold value, or by more than a third predefined threshold value, the second predefined threshold value being selected to be less than the third predefined threshold value. In this manner, a differentiated error reaction may be implemented, which may indicate a possible malfunction early on, i.e. when the second predefined threshold value is exceeded, without this malfunction of the cooling device already being present, and the malfunction of the cooling device is first detected and a corresponding error reaction is first initiated in response to the third predefined threshold value being exceeded. Therefore, the early indication of a possible malfunction may even allow the operator of the internal combustion engine to prevent the malfunction of the cooling device from occurring.

The use of an efficiency of the cooling device as a variable characteristic of the functioning of the cooling device, or the use of a temperature downstream from the cooling device as a variable characteristic of the functioning of the cooling device, is particularly suitable for the monitoring of the functionality of the cooling device.

When the temperature downstream from the cooling device is used as a variable characteristic of the functioning of the cooling device, it is also advantageously possible that, in the case of uninterrupted exhaust-gas recirculation, the temperature downstream from the cooling device may be validated, using a temperature in an air supply, downstream from a compressor or an intercooler.

DETAILED DESCRIPTION

Figure 1:
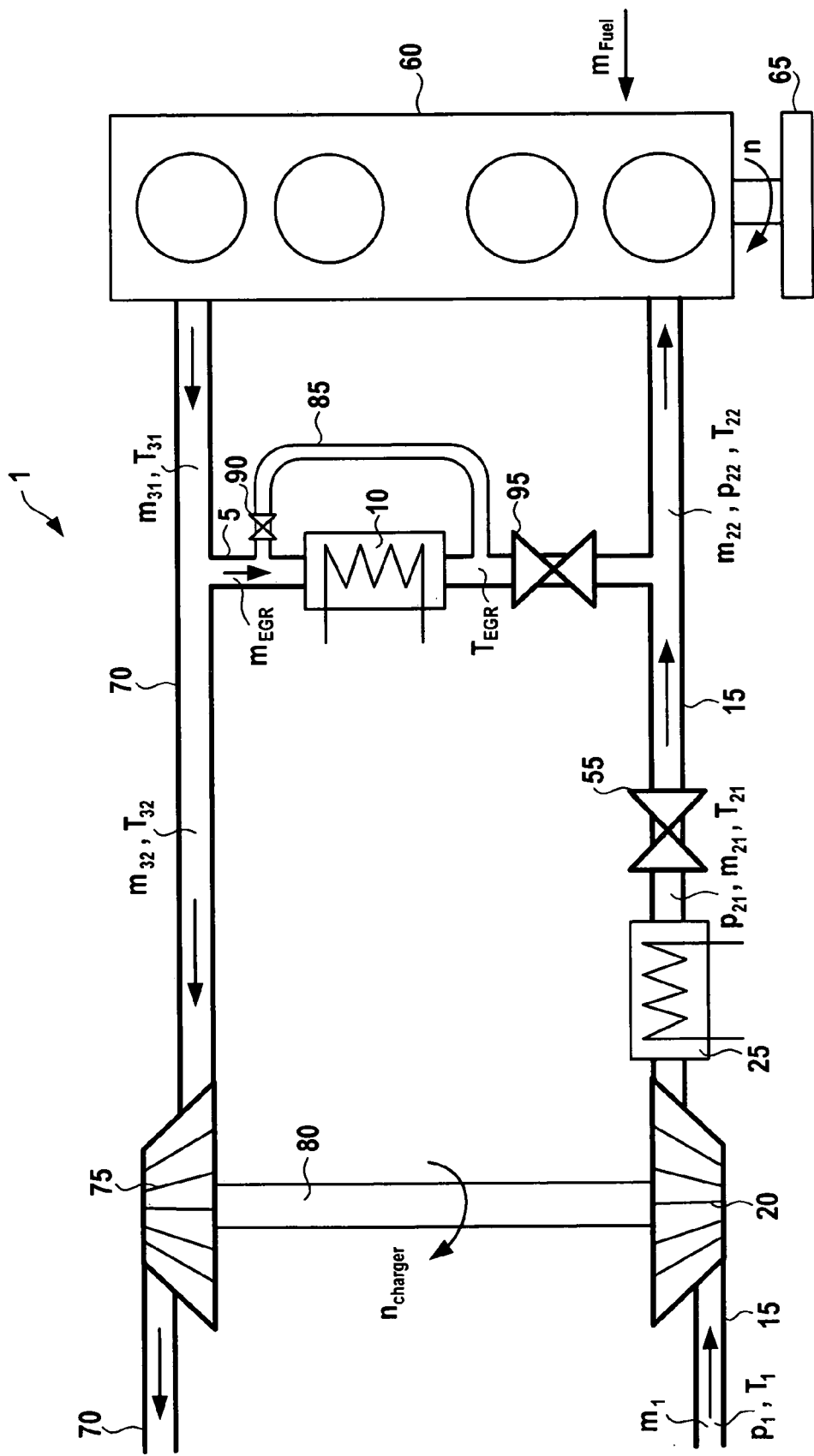
FIG. 1 shows a schematic view of an internal combustion engine.

In FIG. 1, reference numeral 1 designates an internal combustion engine, which propels a vehicle, for example. Internal combustion engine 1 may be, for example, a spark-ignition engine or a diesel engine. In the following, it is exemplarily assumed that internal combustion engine 1 is a diesel engine. It includes a cylinder block 60, which is supplied fresh air via an air supply 15. The flow direction of the fresh air in air supply 15 is indicated in FIG. 1 by arrows. In air supply 15, the fresh air supplied to cylinder block 60 is compressed by a compressor 20. An intercooler 25, which re-cools the fresh air compressed and heated by the compressor, is situated in air supply 15, downstream from compressor 20 in the direction of flow. A throttle valve 55 is situated in air supply 15, downstream from intercooler 25 in the flow direction of the fresh air. An exhaust-gas recirculation line 5 of internal combustion engine 1 opens out into air supply 15, downstream from throttle valve 55 in the direction of flow. The mixture of fresh air and recirculated exhaust gas formed in this manner is then fed to cylinder block 60. Cylinder block 60 is also supplied a mass of fuel $m_{Fuel}$ via, for example, direct injection. The combustion of the air-fuel mixture in cylinder block 60 drives a crankshaft 65 at engine speed n. The exhaust gas formed during the combustion of the air-fuel mixture in cylinder block 60 is discharged into an exhaust branch 70 of internal combustion engine 1. In FIG. 1, the flow direction of the exhaust gas in exhaust branch 70 is likewise indicated by arrows. In this context, exhaust-gas recirculation line 5 branches off from exhaust branch 70. A turbine 75 driven by the mass flow of exhaust gas is positioned in exhaust branch 70, downstream from this branch in the direction of flow. Turbine 75 is connected, in turn, to compressor 20 by a shaft 80 and consequently drives compressor 20. In this manner, compressor 20, shaft 80, and turbine 75 form an exhaust-gas turbocharger, whose rotational speed is denoted in FIG. 1 by $n_{charger}$. According to FIG. 1, a cooling device 10, which is also referred to below as an exhaust-gas recirculation cooler, is situated in exhaust-gas recirculation line 5. A bypass duct 85, which includes a bypass valve 90, runs around exhaust-gas recirculation cooler 10. The direction of flow of exhaust gas in the exhaust-gas recirculation line is indicated by an arrow. In exhaust-gas recirculation line 5, an exhaust-gas recirculation valve 95 is situated downstream from exhaust-gas recirculation cooler 10 in the flow direction of the exhaust gas.

In FIG. 1, $m_1$ indicates a mass flow rate of air, $p_1$ indicates a pressure, and $T_1$ indicates a temperature in air supply 15 upstream from compressor 20. Additionally in FIG. 1, $m_{21}$ indicates a mass flow rate of air, $p_{21}$ indicates a pressure, and $T_{21}$ indicates a temperature downstream from intercooler 25, upstream from the discharge of exhaust-gas recirculation line 5 into air supply 15, and, according to FIG. 1, upstream from throttle valve 55 as well. Additionally in FIG. 1, $m_{22}$ denotes a mass flow rate of air and exhaust gas, $p_{22}$ denotes a pressure, and $T_{22}$ denotes a temperature in air supply 15, downstream from the mouth of exhaust-gas recirculation line 5. Additionally in FIG. 1, $m_{31}$ indicates a mass flow rate of exhaust gas and $T_{31}$ indicates a temperature of the exhaust gas in exhaust branch 70, upstream from the bifurcation of exhaust-gas recirculation line 5. Additionally in FIG. 1, $m_{32}$ indicates a mass flow rate of exhaust gas and $T_{32}$ indicates a temperature of the exhaust gas in exhaust branch 70, downstream from the bifurcation of exhaust-gas recirculation line 5. Additionally in FIG. 1, $m_{EGR}$ denotes the total mass flow rate of recirculated exhaust gas in exhaust-gas recirculation line 5, and $T_{EGR}$ denotes a temperature of the recirculated exhaust gas in exhaust-gas recirculation line 5 downstream from exhaust-gas recirculation cooler 10 and, as shown in FIG. 1, upstream from exhaust-gas recirculation valve 95.

The present invention now provides for the monitoring of the functionality of exhaust-gas recirculation cooler 10. The idea is that, on the basis of available measured values, it is determined if the functioning of exhaust-gas recirculation cooler 10 situated in exhaust-gas recirculation line 5 is so impaired that, e.g. the exhaust-emissions limits defined by the legislature are being exceeded. The reasons for the incorrect functioning of exhaust-gas recirculation cooler 10 may be, for example, that the heat-transfer coefficient of the pipe system of the cooler has decreased considerably due to soot or carbon-black deposits of the exhaust gas, that the coolant supply is interrupted in the case of water cooling, or that the exhaust gas is not directed through the exhaust-gas recirculation cooler at all, since optional bypass valve 90 in optional bypass duct 85 is stuck in the open position.

A malfunction or even a breakdown of exhaust-gas recirculation cooler 10 leads to an increase in temperature $T_{EGR}$ downstream from exhaust-gas recirculation cooler 10 in exhaust-gas recirculation line 5, as well as in temperature $T_{22}$ after the mixing of the recirculated exhaust gas with the mass flow of fresh air supplied to cylinder block 60, downstream from the discharge of exhaust-gas recirculation line 5 into air supply 15. The monitoring function of the present invention is designed so that a variable characteristic of the functioning of exhaust-gas recirculation cooler 10 is monitored. In this context, the variable characteristic of the functioning of exhaust-gas recirculation cooler 10 is ascertained as a function of a measured value. In addition, the variable characteristic of the functioning of exhaust-gas recirculation cooler 10 is selected on the basis of an intact exhaust-gas recirculation cooler 10. The ascertained value of the variable characteristic of the functioning of exhaust-gas recirculation cooler 10 is then compared to the predefined value. An error is detected, when the ascertained value of the variable characteristic of the function of cooling device 10 deviates from the specified value. In the following, it shall be exemplarily assumed that a temperature downstream from exhaust-gas recirculation cooler 10 is selected as a variable characteristic of the functioning of exhaust-gas recirculation cooler 10. This temperature-may be temperature $T_{EGR}$ or temperature $T_{22}$. The monitoring function is designed so that one of the two temperatures $T_{EGR}$, $T_{22}$ is alternately monitored, depending on which temperature sensor is provided by the user for measuring one of the two temperatures, e.g. on the basis of more favorable installation conditions. The basis for the monitoring function of the present invention is a physically-based air-system model, as is known, for example, from German Published Patent Application No. 199 63 358. The air-system model known from German Published Patent Application No. 199 63 358 is still not based on the use of an exhaust-gas recirculation cooler. Nevertheless, the influence of exhaust-gas recirculation cooler 10 on temperature $T_{EGR}$ in the air-system model known from German Published Patent Application No. 199 63 358 A1 may be taken into account in the same manner as the influence of the intercooler present there on the temperature in the air supply downstream from the intercooler. Therefore, for exhaust-gas recirculation cooler 10 in the present case, the following may be determined for the modeling of temperature $T_{EGR}$ in a manner analogous to German Published Patent Application No. 199 63 358. A portion of the heat of the recirculated exhaust gas is removed by exhaust-gas recirculation cooler 10. This may be taken into account by a corresponding exhaust-gas recirculation cooler model in a manner analogous to the intercooler model from German Published Patent Application No. 199 63 358. In this context, the greater the proportion of the heat removed from the recirculated exhaust gas, the higher the effectiveness, i.e. the efficiency, of exhaust-gas recirculation cooler 10. This means that temperature $T_{EGR}$ ascertained in the temperature determination of the air-system model is reduced as a function of the efficiency of exhaust-gas recirculation cooler 10. The air-system model is now applied to the present monitoring function of exhaust-gas recirculation cooler 10 in such a manner, that the efficiency of exhaust-gas recirculation cooler 10 modeled in this way corresponds to that of an intact, correctly functioning exhaust-gas recirculation cooler 10. This means that in the air-system model, temperature $T_{EGR}$ is calculated on the basis of intact exhaust-gas recirculation cooler 10. The same applies to temperature $T_{22}$, which is calculated from the ratio of mass flow rate of recirculated exhaust gas $m_{EGR}$ to mass flow rate of supplied fresh air $m_2$, and their temperatures $T_{EGR}$ and $T_{21}$, as follows:

$$T_{22} = \frac{m_{21}}{m_{22}} T_{21} + \frac{m_{EGR}}{m_{22}} T_{EGR} \quad (1)$$

where $m_{22} = m_{21} + m_{EGR}$ \quad (2)

Therefore, it is possible to compare temperature $T_{EGR}$ or $T_{22}$ of the air-system model, which are calculated in the described manner through modeling and selected in this manner on the basis of an intact exhaust-gas recirculation cooler 10, to the correspondingly measured temperature of a temperature sensor for temperature $T_{EGR}$ or $T_{22}$. In the example according to FIG. 1, the temperature sensor for measuring temperature $T_{EGR}$ is provided in exhaust-gas recirculation line 5, downstream from exhaust-gas recirculation cooler 10 and upstream from exhaust-gas recirculation valve 95. In this context, the temperature sensor alternatively or additionally used for ascertaining temperature $T_{22}$ is provided in air supply 15, downstream from the discharge of exhaust-gas recirculation line 5 into air supply 15. In the following, the temperature downstream from exhaust-gas recirculation cooler 10 in exhaust-gas recirculation line 5, predefined by the air-system model, is referred to as $T_{EGRV}$, and the temperature downstream from the discharge of exhaust-gas recirculation line 5 into air supply 15, predefined by the air-system model, is referred to as $T_{22V}$. The temperature measured downstream from exhaust-gas recirculation cooler 10 in exhaust-gas recirculation line 5 is hereinafter designated as $T_{EGRM}$, and the temperature measured downstream from the discharge of exhaust-gas recirculation line 5 into air supply 15 is designated as $T_{22M}$. If exhaust-gas recirculation cooler 10 has a defect, then measured temperature $T_{EGRM}$ increases in contrast to specified temperature $T_{EGRV}$ of the air-system model. In this case, measured temperature $T_{22M}$ correspondingly increases in comparison with predefined temperature $T_{22V}$ of the air-system model. An error of exhaust-gas recirculation cooler 10 is detected on the basis of the deviation of measured temperature $T_{EGRM}$ from predefined temperature $T_{EGRV}$, and on the basis of the deviation of measured temperature $T_{22M}$ from predefined temperature $T_{22V}$.

In this context, it may be advantageously provided that an error of exhaust-gas recirculation cooler 10 is only detected, when the magnitude of the difference between measured temperature $T_{EGRM}$ and predefined temperature $T_{EGRV}$ exceeds a first predefined threshold value. Similarly, it may be optionally provided that an error of exhaust-gas recirculation cooler 10 be only detected, when the absolute value of the difference between measured temperature $T_{22M}$ and predefined temperature $T_{22V}$ is likewise greater than a first threshold value correspondingly specified for this temperature $T_{22}$. In this context, the first predefined threshold value in question is applied, for example, on a test bench, so that measuring inaccuracies of the utilized sensors and modeling inaccuracies of the utilized air-system model are taken into account.

Figure 2:
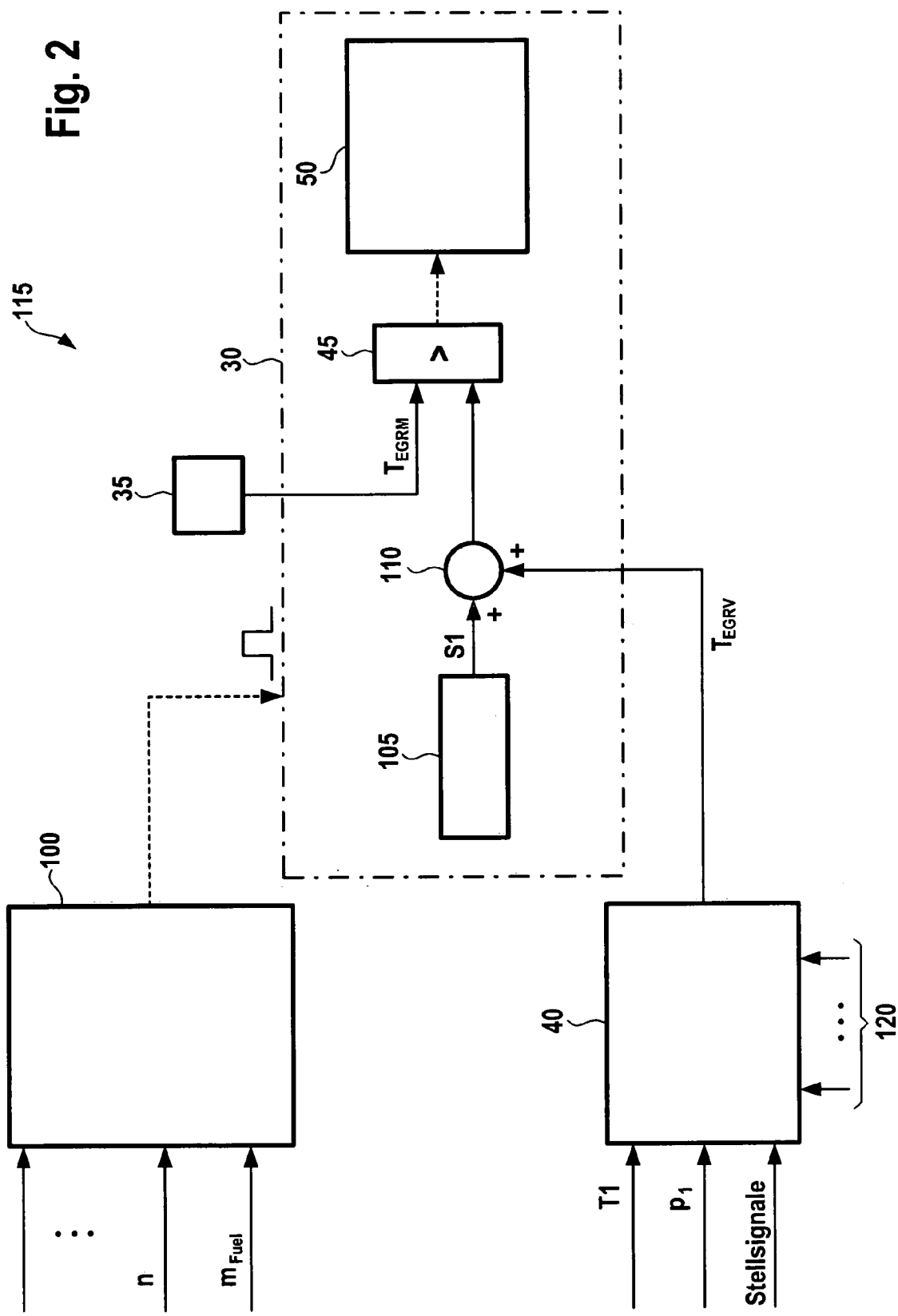
FIG. 2 shows a flow chart to explain the method according to the present invention and the device according to the present invention.

Shown in FIG. 2 is a flow chart for explaining the method of the present invention and the device of the present invention. In this context, the flow chart may be implemented in an engine control unit 115 in the form of software and/or hardware. The flow chart includes physical air-system model 40, which is supplied measured operating parameters of internal combustion engine 1, such as pressure $p_1$ and/or $p_{21}$ and temperature $T_1$ and/or $T_{21}$, as well as actuating signals for, e.g. setting a desired geometry of turbine 75 in order to set a desired turbo pressure and/or for setting a desired degree of opening of exhaust-gas recirculation valve 95 in order to set a desired exhaust-gas recirculation rate and/or for setting a desired degree of opening of throttle valve 55 in order to set a desired throttle cross-sectional area. The supply of further input variables to physical air-system model 40, such as engine speed n, mass flow rate of air $m_1$, and mass flow rate of supplied fuel $m_{Fuel}$, is indicated in FIG. 2 by reference numeral 120. In the following, it shall be exemplarily assumed that the monitoring function is carried out on the basis of temperature $T_{EGR}$ downstream from exhaust-gas recirculation cooler 10 in exhaust-gas recirculation line 5. Therefore, specified temperature $T_{EGRV}$ is regarded as an output variable of physical air-system model 40 for the present monitoring function, the specified temperature being supplied to a summing element 110 of a monitoring unit 30. Temperature $T_{EGRM}$ is measured by a temperature sensor 35 and transmitted to a comparison element 45 of monitoring unit 30, the temperature sensor not being shown FIG. 1 and being between exhaust-gas recirculation valve 95 and exhaust-gas recirculation cooler 10 in exhaust-gas recirculation line 5. Monitoring unit 30 also includes an offset memory 105, in which first, predefined threshold value S1 of temperature $T_{EGR}$ is stored, and which likewise transmits this first, predefined threshold value S1 to summing element 110. Consequently, first predefined threshold value S1 for temperature $T_{EGR}$ is added to specified temperature $T_{EGRV}$ in summing element 110. The sum formed in the process is likewise supplied to comparison element 45. If measured temperature $T_{EGRM}$ is now greater than the sum S1+$T_{EGRV}$ at the output of summing element 110, then comparison element 45 sets an error bit and transmits it to an error-detection unit 50 of monitoring unit 30. If error-recognition unit 50 detects a set error bit at its input, then it initiates an error reaction, which may be optical and/or acoustic signaling of a defective exhaust-gas recirculation cooler 10. Furthermore, it may optionally be provided that error-detection unit 50 initiate an emergency operating measure of internal combustion engine 1 as an error reaction, in that it reduces or switches off the power of internal combustion engine 1, e.g. by correspondingly reducing or interrupting the supply of fuel.

Exhaust-gas recirculation cooler 10 may be monitored in a corresponding manner with the aid of temperature $T_{22}$, when specified temperature $T_{22V}$ is used as an output variable of physical air-system model 40, and when a temperature sensor for ascertaining temperature $T_{22M}$ is provided in air supply 15 downstream from the discharge of exhaust-gas recirculation line 5 into air supply 15. In this case, offset memory 105 would additionally provide the first, specified threshold value used for temperature $T_{22}$, e.g. S1.

It may also be provided that exhaust-gas recirculation cooler 10 be only monitored at specified operating points of internal combustion engine 1. In this context, operating points of internal combustion engine 1, at which the mass flow rate of recirculated exhaust gas is set above a predefined threshold value, may be selected as predefined operating points. The predefined threshold value for the mass flow rate of recirculated exhaust gas may be suitably applied, for example, on a test bench, and namely in such a manner, that the influence of exhaust-gas recirculation cooler 10 on temperature $T_{22}$ is especially significant with regard to complying with specified limiting values for exhaust emissions. A sufficiently large mass flow rate of recirculated exhaust gas $m_{EGR}$ is ensured in that, for the monitoring of exhaust-gas recirculation cooler 10, engine speed n and mass flow rate of fuel $m_{Fuel}$ must be within limits to be suitably specified. Therefore, in the case of an internal combustion engine 1, to which the predefined threshold value for the mass flow rate of recirculated exhaust gas has been applied in this manner, mass flow rate of recirculated exhaust gas $m_{EGR}$ is also fixed. In addition, it may be additionally or alternatively provided that operating points of internal combustion engine 1, at which internal combustion engine 1 is essentially operated at steady-state, be selected as predefined operating points for the monitoring. In steady-state operation of internal combustion engine 1, erroneous influences of a dynamic change in operating parameters, in particular with regard to the modeling of temperature $T_{EGRV}$, may be prevented in the same manner as falsifications, in particular time delays during the measurement of temperatures $T_{EGRM}$ or $T_{22M}$, due to the inertia of the utilized temperature sensors. Thus, a release-determination unit 100, to which, in turn, operating parameters of internal combustion engine 1 are transmitted, may be provided as also shown in FIG. 2. Examples of these operating parameters include, in particular, engine speed n and the engine load, which may be characterized by, e.g. mass flow rate of injected fuel $m_{Fuel}$. Engine speed n is measured in a manner known to one skilled in the art, e.g. by an rpm sensor, whereas mass flow rate of injected fuel $m_{Fuel}$ is known to be used in engine control unit 115, e.g. for setting a predefined air/fuel mixture ratio. The use of further input variables for release-determination unit 100 is indicated in FIG. 2. These may also include, e.g. actuating signals, which are used for setting a desired turbo pressure or a desired exhaust-gas recirculation rate, as already described. They may also include signals, which indicate if the exhaust-gas recirculation control is being operated in a standard mode or, for example, in a regeneration mode; or the actuating signal of bypass valve 90. Release-determination unit 100 then checks, in the case of the exhaust-gas recirculation rate to be adjusted by the corresponding signal, if the mass flow rate of recirculated exhaust gas resulting from this is exceeding the threshold value specified for it, or if the operating points defined by engine speed n and mass flow rate of fuel $m_{Fuel}$ are within the applied limits. It may also be provided that release-determination unit 100 only initiates the activation of the monitoring function via monitoring unit 30, when the exhaust-gas recirculation control system is in standard mode and not in regeneration mode. Furthermore, it may be provided that release-determination unit 100 only initiates the activation of the monitoring function via monitoring unit 30, when bypass valve 90 is completely closed. If this is the case, then release-determination unit 100 initiates the activation of the monitoring function via monitoring unit 30. Otherwise, the described monitoring function remains deactivated. In addition, or as an alternative, as a condition for activating monitoring unit 30 for monitoring exhaust-gas recirculation cooler 10, release-determination unit 100 may determine from the supplied operating parameters of internal combustion engine 1, in a manner known to one skilled in the art, if the operating state is steady-state, e.g. if engine speed n and supplied amount of fuel $m_{Fuel}$ have already been essentially constant for at least a predefined period of time. In this context, the predefined period of time may be suitably applied, for example, on a test bench and should be selected to be large enough to be able to reliably detect the setting of a steady-state operating state of internal combustion engine 1. In addition, or as an alternative, steady-state operation may be detected, when the time gradient of a modeled temperature, e.g. $T_{EGRV}$ or $T_{22V}$ is lower than a predefined threshold value. If not all of the conditions for steady-state operation are present, then the monitoring function remains deactivated.

The monitoring function of the present invention may be easily expanded to several threshold values. In this context, e.g. it may be provided that a first error reaction be initiated in the case in which measured temperature $T_{EGRM}$ exceeds specified temperature $T_{EGRV}$ by more than a second predefined threshold value. In the case in which measured temperature $T_{EGRM}$ exceeds specified temperature $T_{EGRV}$ by more than a third specified threshold value, which is greater than the second specified threshold value, a second error reaction may then be initiated. Further stages, which each have a correspondingly greater threshold value, may be provided in a corresponding manner, which means that more than two different error reactions may also be initiated. The first error reaction may be an optical and/or acoustic warning, which refers to a possible defect of exhaust-gas recirculation cooler 10, without exhaust-gas recirculation cooler 10 actually being defective. A defect of exhaust-gas recirculation cooler 10 is only detected and optically and/or acoustically signaled by the second error reaction, when the third predefined threshold value is exceeded, in which case an emergency measure for internal combustion engine 1 may be additionally initiated in the described manner. In this context, the second predefined threshold value should be selected so that a warning signal is not unnecessarily emitted; preferably, the second predefined threshold value is as close as possible to the third predefined threshold value. Corresponding multistage monitoring may be implemented analogously for the described monitoring of temperature $T_{22}$.

The initiation of an emergency operation may be provided, for example, as a third error reaction, when measured temperature $T_{EGRM}$ exceeds specified temperature $T_{EGRV}$ by more than a fourth predefined threshold value, which is greater than the third predefined threshold value. The switching off of the internal combustion engine may be initiated, for example, as a fourth error reaction, when measured temperature $T_{EGRM}$ exceeds specified temperature $T_{EGRV}$ by more than a fifth predefined threshold value, which is greater than the fourth predefined threshold value. In this context, the individual, predefined threshold values are to be suitably applied on a test bench in such a manner, that the initiation of the assigned error reactions only actually occurs, when these error reactions are actually necessary for protecting the components of internal combustion engine 1 and preserving driving safety.

In the case of only a single-stage error reaction, the previously-described, first threshold value may correspond to the second, third, fourth, or fifth predefined threshold value. An advantage of monitoring the function of exhaust-gas recirculation cooler 10 via temperature $T_{22}$ is that the temperature sensor, which is for measuring temperature $T_{22M}$ and is used for this monitoring, may be verified by a temperature sensor, which measures temperature $T_{21}$ in air supply 15 downstream from intercooler 25 and, as shown in FIG. 1, upstream from throttle valve 55. This verification should occur when exhaust-gas recirculation valve 95 is closed, since the two named temperature sensors would have to measure the same temperature in this state, when the exhaust-gas recirculation is interrupted. In this context, the described verification may also be carried out during operation of internal combustion engine 1.

A physical air-system model, such as the one already known from German Published Patent Application No. 199 63 358, was used as a starting point for the described monitoring function of exhaust-gas recirculation cooler 10 according to the present invention. When using new sensors, such as a temperature sensor for measuring temperature $T_{EGRM}$ or a temperature sensor for measuring temperature $T_{22M}$, it is useful to take into account this additionally measured temperature $T_{EGRM}$ or $T_{22M}$ in air-system model 40, as well. This could be accomplished, for example, by no longer having to use an intact exhaust-gas recirculation cooler 10 as a starting point while calculating specified temperature $T_{EGRV}$ or calculating specified temperature $T_{22V}$, but rather by adjusting calculated, specified temperature $T_{EGRV}$ to measured temperature $T_{EGRM}$ or adjusting calculated, specified temperature $T_{22V}$ to measured temperature $T_{22M}$, by correspondingly changing the efficiency of exhaust-gas recirculation cooler 10 in the exhaust-gas recirculation cooler model of air-system model 40. Since calculated, specified temperature $T_{EGRV}$ or $T_{22V}$ is adjusted to the corresponding, measured sensor temperature, this temperature may no longer be used for monitoring.

In this case, the efficiency of exhaust-gas recirculation cooler 10 calculated for the adjustment of calculated, specified temperature $T_{EGRV}$ or $T_{22V}$ to the corresponding, measured sensor temperature is then monitored as a variable characteristic of the function of exhaust-gas recirculation cooler 10. If the efficiency of exhaust-gas recirculation cooler 10 calculated during the adjustment of calculated, specified temperature $T_{EGRV}$ or $T_{22V}$ to corresponding, measured sensor temperature $T_{EGRM}$ or $T_{22M}$ in correspondingly modified air-system model 40 falls below a specified threshold value, which is equal to the efficiency of intact exhaust-gas recirculation cooler 10 minus a predefined offset value, then an error of exhaust-gas recirculation cooler 10 is detected. In this context, the predefined threshold value or the predefined offset value is applied, e.g. on a test bench, in such a manner, that any measuring inaccuracies and model inaccuracies are taken into account during error detection and are not erroneously detected as errors of exhaust-gas recirculation cooler 10. Even in this case of using the efficiency as a variable characteristic of exhaust-gas recirculation cooler 10, multistage error detection having different error reactions in response to different threshold values being undershot by the efficiency of exhaust-gas recirculation cooler 10 calculated in the modified air-system model, may be implemented in a manner analogous to the procedure described for the temperature.

The described monitoring function of the present invention has the advantage that it does not require any additional algorithms for calculating the variables necessary for the monitoring and dispenses with the application expenditure associated with this. It uses the input variables of air-system model 40, which are already utilized in engine control unit 115 for, e.g. other important control-unit functions, and therefore expands its application uses.

As known from German Published Patent Application No. 199 63 358, physical air-system model 40 calculates additional state variables or operating parameters of internal combustion engine 1 as a function of available sensory systems, using physical relationships.

What is claimed is:

1. A device for operating an internal combustion engine having an exhaust-gas recirculation and a cooling device for cooling a recirculated exhaust gas, comprising:
   an arrangement for monitoring a variable characteristic of a functioning of the cooling device;
   an arrangement for ascertaining the variable characteristic of the functioning of the cooling device as a function of a measured value;
   an arrangement for selecting the variable characteristic of the functioning of the cooling device on the basis of the cooling device being intact;
   an arrangement for comparing an ascertained value of the variable characteristic of the functioning of the cooling device to a specified value; and
   an arrangement for detecting an error if the ascertained value deviates from the specified value, wherein the error is detected only if the ascertained value deviates from the specified value by more than a first predefined threshold value.

2. A method for operating an internal combustion engine having an exhaust-gas recirculation and a cooling device for cooling a recirculated exhaust gas, comprising:
   monitoring a variable characteristic of a functioning of the cooling device;
   ascertaining the variable characteristic of the functioning of the cooling device as a function of a measured value;
   selecting the variable characteristic of the functioning of the cooling device on the basis of the cooling device being intact;
   comparing an ascertained value of the variable characteristic of the functioning of the cooling device to a specified value;
   detecting an error if the ascertained value deviates from the specified value; and
   initiating a first error reaction if the ascertained value deviates from the specified value by more than a first predefined threshold value.

3. The method as recited in claim 2, further comprising:
   initiating a second error reaction if the ascertained value deviates from the specified value by more than a second predefined threshold value.

4. The method as recited in claim 3, wherein:
   the second predefined threshold value is greater than the first predefined threshold value.

5. A method for operating an internal combustion engine having an exhaust-gas recirculation and a cooling device for cooling a recirculated exhaust gas, comprising:
   monitoring a variable characteristic of a functioning of the cooling device;
   ascertaining the variable characteristic of the functioning of the cooling device as a function of a measured value;
   selecting the variable characteristic of the functioning of the cooling device on the basis of the cooling device being intact;

comparing an ascertained value of the variable characteristic of the functioning of the cooling device to a specified value; and detecting an error if the ascertained value deviates from the specified value, wherein the error is detected only if the ascertained value deviates from the specified value by more than a first predefined threshold value.

6. The method as recited in claim 1, further comprising:
selecting an efficiency of the cooling device as the variable characteristic of the functioning of the cooling device.

7. The method as recited in claim 1, wherein:
the monitoring is only carried out at predefined operating points of the internal combustion engine.

8. The method as recited in claim 7, further comprising:
selecting as the predefined operating points operating points of the internal combustion engine that have a mass flow rate of the recirculated exhaust gas greater than a specified threshold value.

9. The method as recited in claim 7, further comprising:
selecting as the predefined operating points operating points of the internal combustion engine at which the internal combustion engine is operated at steady-state.

10. The method as recited in claim 1, further comprising:
selecting a temperature downstream from the cooling device as the variable characteristic of the functioning of the cooling device.

11. The method as recited in claim 10, further comprising:
verifying, if a recirculation of the recirculated exhaust gas is interrupted, the temperature downstream from the cooling device by using a temperature in an air supply of the internal combustion engine downstream from one of a compressor and an intercooler.

* * * * *